BALANCED CLOCK

Filed April 5, 1965

INVENTORS
THORE-JAN JOHANSEN
EDWARD J. OSSOLINSKI
GORDON L. SMITH
BY Melvin P. Williams
ATTORNEY 3,386,038
BALANCED CLOCK
Thore Jan Johansen, Wappingers Falls, and Edward J. Ossolinski and Gordon L. Smith, Poughkeepsie, N.Y., assignors to International Business Machines Corporation, Armonk, N.Y., a corporation of New York
Filed Apr. 5, 1965, Ser. No. 445,671
2 Claims. (Cl. 328—162)

ABSTRACT OF THE DISCLOSURE

A clock signal powering and distribution network for a data processing system employing components having different response times to "turn on" and "turn off" control signals. The utilization of a pair of similar signal level inverters at each level of signal delay and distribution enables the "turn on," "turn off" response difference of one of the pair to compensate for the response difference of the other whereby signals can be powered and distributed without significant distortion.

This invention relates to data processing, and more particularly to a balanced clock arrangement therefor.

In the data processing art, timing of data transfers in a system is usually achieved by providing basic clock signals which are routed to the various parts of the system through delay lines, inverters, etc., so as to achieve at each of the data transfer points of the system a set of timing signals which occur at the same time as they do in other parts of the system. Clock circuits of the prior art have presented a problem in the maintenance of proper pulse widths even though the basic timing of the clock signal may be accurately established at any point. This problem is due to the fact that each delay line which is used requires an active terminating circuit and normally such circuit will have a different turn on time than turn off time such that, assuming that the "turn on" is slower than the "turn off," a positive clock signal will become shorter and shorter in terms of its pulse width, as it proceeds through successive delay lines and terminating circuits to the actual point in the system where the pulse is used. Although this narrowing may be compensated by utilizing extra wide pulses which can be reduced in width in the same circuits that provide the basic timing, whenever a test voltage bias is put on the system (a maintenance operation involving putting too high a voltage and/or too low a voltage on circuits) the pulse width will vary from whatever has been established as standard because of the differing response of the circuits to the change in the voltage. One solution has been to put the clock on separate powering circuits, which means that there must be a separate voltage supply at any point in the system where there is a dynamic element relating to the clock. In current, modular systems, this means extra voltage buses, on the cards, gates, boards or whatever supporting devices are utilized to hold the actual circuitry in the different parts of the system.

An object of the present invention is an improved clocking system.

Another object of the invention is to provide a balanced clock system which maintains a relatively stable pulse width at various points in the system.

A further object of the invention is to provide a clock pulse distribution network in a data processing system which does not vary the clock pulse width significantly as the voltage of the power supply is varied above or below the nominal voltage.

This invention permits use of a single power supply for both clocking and logical circuits while maintaining the ability to apply a voltage-bias to the system for maintenance purposes; it also permits a greater degree of control over the pulse widths at the various points of the system, whereby clocking pulses used for gating successive bistable devices within the system need not be overlapped by as great an amount as would otherwise be required to assure the progression of signals in a forward (rather than a backward) direction. The use of the present invention reduces the cost-per-performance ratio of clocking in a data processing system.

Other objects, features and advantages of the present invention will become more apparent in the light of the following detailed description of a particular embodiment thereof, as shown in the drawing, in which.

This invention is utilized in a large scale data processing system, one embodiment of which is the subject matter of a copending application of the same assignee entitled "Large Scale Data Processing System," Ser. No. 445,326, filed Apr. 5, 1965, by O. L. MacSorley et al., is now abandoned and has been replaced by a continuation-in-part application Ser. No. 609,238, filed Jan. 13, 1967, by the same inventors and with the same title.

Figure 1:
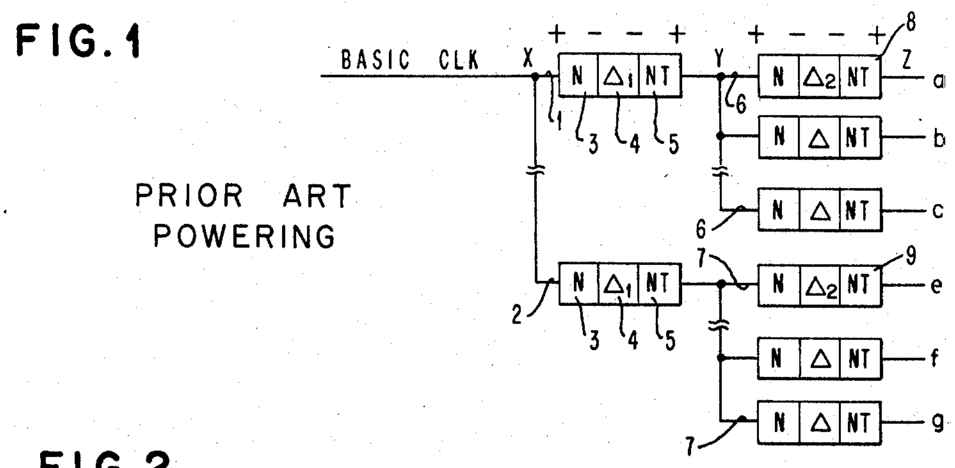
FIG. 1 is an illustrative diagram of prior art powering.
Figures 2, 3:
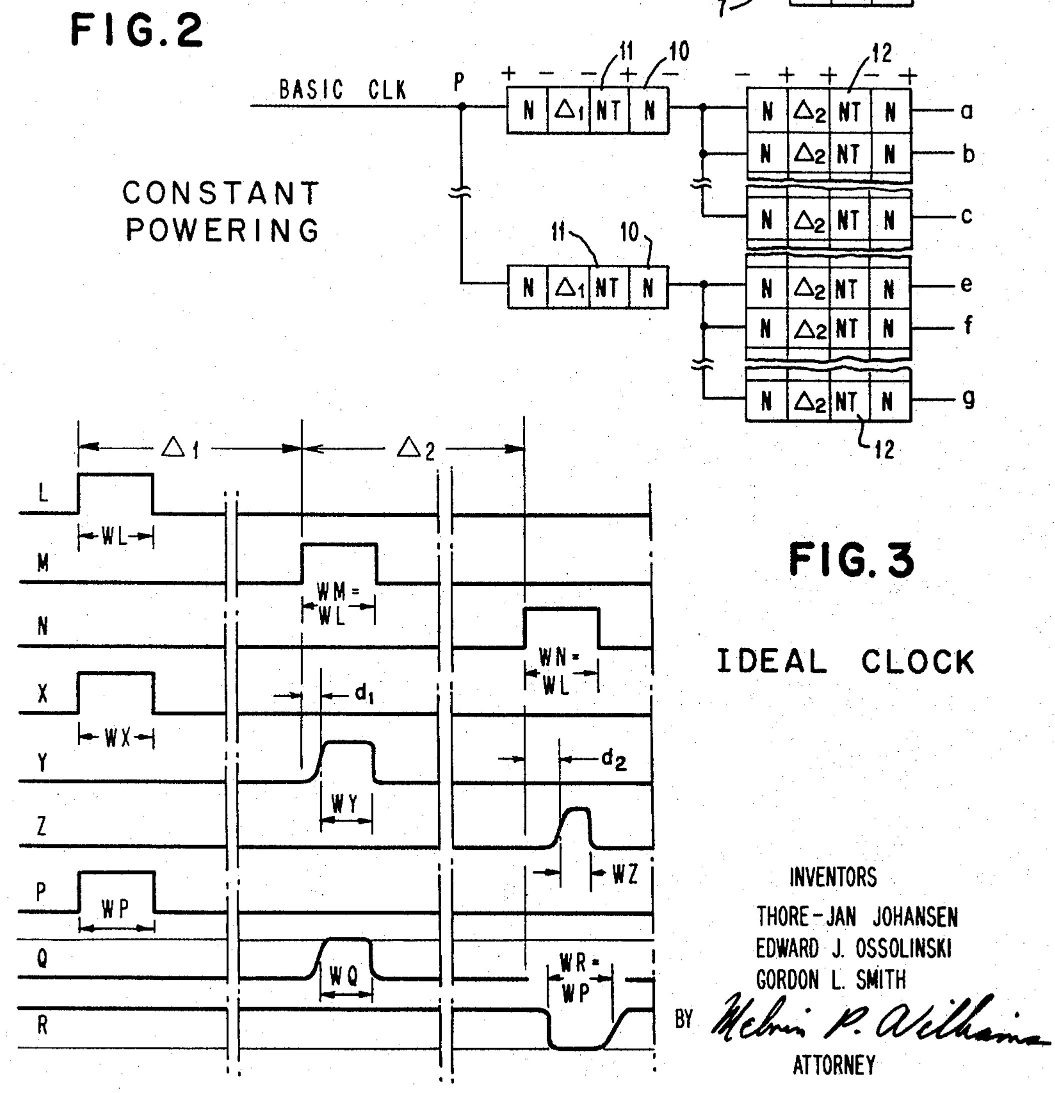
FIG. 2 is a schematic block diagram illustrating a balanced clock having constant powering in accordance with an embodiment of the present invention.
FIG. 3 is a timing diagram which illustrates the pulse width of an ideal clock, a prior art clock, and a clock in accordance with the present invention.

In FIG. 1, the normal way of powering a basic clock signal so as to cause it to "fan out" to many points within the system is illustrated. The usual form of clocking circuits includes various branches, the branches having delay units and powering circuits therein. In the present embodiment, the powering circuits are conventional signal inverting amplifiers, hereafter simply called inverters. In some instances, cathode followers, or emitter followers may be utilized, with or without inverters. In this case, inverters have been chosen as a powering circuit due to the simplicity of illustrating the present invention, and because of the general utility thereof in actual implementations of a system in accordance with the present embodiment. In FIG. 1, the basic clock signal is applied to two different legs 1, 2, each including a first circuit complex comprising an inverter 3 to drive a delay unit, a delay unit 4 and an inverting terminator block (NT) 5. The output of the inverter terminator 5 is, in each case, applied to a further plurality of circuits 6, 7. In an actual machine, there may be as many as fifty circuits represented by the circuit 6, and another fifty circuits represented by the circuit 7. Thus it appears that the inverter terminator block 5 may be extremely heavily loaded, which causes a reduction in the time-response characteristics of these circuits. Referring to FIG. 3, a plurality of illustrations L, M, N illustrate ideal operations of a circuit such as that shown in FIG. 1. These illustrate that under ideal conditions, the pulse width of the basic clock signals will be the same without regard to the number of circuits through which it is passed. However, due to the characteristics of the inverter terminator blocks, this type of operation is not obtainable. In actual practice, operations such as illustrated by X, Y and Z in FIG. 3 can be expected. In accordance with the illustration, it can be seen that the loading of the inverter terminator block has caused the width of the signal at Y to be less than the width of the signal at X. This is, due to the fact that a delay line terminator block which is heavily loaded by a plurality of circuits (6, 7), will have a slower "turn on" response characteristic than "turn off" response characteristic. Since the inverter terminator turns on relatively slowly compared with the speed at which it turns off, the output pulse does not reach its maximum value until after a definite delay from the energization of the inverter terminator by a pulse from the delay line. This effect is further compounded at the inverter terminator 8, 9 due to the fact that the pulse is already late in starting when it is applied to the inverter terminator (as a result of the characteristics of the inverter terminators 5) even though the "turn off" of the inverter terminators 5 is relatively rapid and will therefore remain much closer to constant as the signal is passed through successive inverter terminators.

The effect shown by the illustrations X, Y, Z in FIG. 3 can be compensated for by specially tuning each of the circuits where pulse width is critical. However, special tuning requires constant repetition rate and constant potential of clocking signals in order for the tuning to remain effective. Whenever test voltage or frequency change biasing is utilized, any special tuning compensation becomes useless, and the circuits will fail simply because of the pulse width variations illustrated in FIG. 3. Additionally, when the voltage on the clock signal is lowered, the effect of the loading on the characteristics of the inverter terminator are further complicated. This is illustrated briefly in illustrations X, Y, and Z by delays *d*1 and *d*2, indicated by the dashed lines, which show that a reduced voltage causes the slow turn-on characteristics to be further compounded. Therefore, voltage biasing will, in and of itself, cause the effects illustrated in FIG. 3 to become so pronounced that the clock signals will become totally erratic insofar as system operation is concerned, thereby preventing actual voltage bias tests upon the circuits to find those circuits which will fail with a slightly lower voltage.

To alleviate the above situations, a circuit in accordance with the present embodiment provides additional inverters as shown in FIG. 2. As shown by the signal phase + and − symbols in FIG. 2, an additional inverter 10 causes a net phase change from the input of a first inverter terminator 11 whose output is shown in line Q of FIG. 3 to the input of a second inverter terminator 12 whose output is shown on line R of FIG. 3. This means that inverter terminator 12 must turn off rather than turn on. Thus, though the illustrations P and Q are identical to the illustrations X and Y with pulse WQ at the output of terminator 11 somewhat narrower than the original pulse WP, illustration R shows that even though this shortened pulse WQ is applied to the inverter terminator 12, since it turns off immediately and turn back on rather slowly, it will generate a rather wide negative pulse WR equal in length to pulse WP, thereby compensating for the slow turn on the pulse shown in Q so that the actual pulse width will be equal to the original pulse width WP.

Although slow turn on, in a positive-going sense, is illustrated, it should be understood that various circuits designed to work under various pluralities of potential will operate in a similar manner, whether it be "turn on,"

"turn off," at the rise of, or at the fall of the pulse width.

While the invention has been shown and described with respect to a particular embodiment thereof, it should be apparent to those skilled in the art that various changes and omissions in the form and detail thereof my be made therein without departing from the spirit and scope of the invention.

What is claimed is:

1. A clock signal distributing circuit for a data processing system, comprising:

clocking means for supplying a basic clock signal;

a plurality of means responsive to said clocking for powering and distributing said basic clock signal to a plurality of utilization points, each means of said plurality of means including at least one delay line and a number of amplifier signal inverting circuits, at least one of said inverting circuits being a terminating inverting circuit, each inverting circuit having a "turn on" response different from its "turn off" response, each of said delay lines receiving signals from one of said inverting circuits, each delay line supplying signals to a terminating inverting circuit and each terminating inverting circuit supplying a delayed and inverted clock signal to an inverting circuit having a corresponding "turn on," "turn off" response.

2. A clock signal distributing circuit for a data processing system, and comprising:

means for producing a basic clock signal;

and a plurality of distribution element groups for powering and distributing said basic clock signal to a plurality of utilization points, said distribution element groups being arranged in series-parallel fashion so as to form a clock signal fan-out tree, each of said distribution element groups comprising at least one delay line, and a plurality of amplifier inverter elements each having a response to a "turn on" signal which is different from its response to a "turn off" signal, each amplifier inverter element having means connecting it to a corresponding amplifier inverter element having a corresponding "turn on," "turn off" response, whereby distortion of a clock signal through said plurality of distribution element groups is minimized.

References Cited

UNITED STATES PATENTS

| | | | |
|---|---|---|---|
| 2,988,735 | 6/1961 | Everett et al. | 340—172.5 X |
| 3,254,233 | 5/1966 | Kobayashi et al. | 328—56 X |

ARTHUR GAUSS, *Primary Examiner.*

J. ZAZWORSKY, *Assistant Examiner.*